(12) United States Patent
Amalokwu et al.

(10) Patent No.: US 12,687,650 B2
(45) Date of Patent: Jul. 21, 2026

(54) METHODS OF GENERATING A PARAMETER REALIZATION FOR A SUBSURFACE PARAMETER

(71) Applicant: ExxonMobil Technology and Engineering Company, Spring, TX (US)

(72) Inventors: Kelvin I. Amalokwu, Houston, TX (US); Brian R. Crawford, The Woodlands, TX (US); Ripudaman Manchanda, Houston, TX (US); Gauthier D. Becker, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 385 days.

(21) Appl. No.: 18/507,295

(22) Filed: Nov. 13, 2023

(65) Prior Publication Data

US 2024/0210583 A1 Jun. 27, 2024

Related U.S. Application Data

(60) Provisional application No. 63/476,426, filed on Dec. 21, 2022.

(51) Int. Cl.
G01V 1/28 (2006.01)
G06F 17/18 (2006.01)

(52) U.S. Cl.
CPC .............. G01V 1/282 (2013.01); G06F 17/18 (2013.01); G01V 2210/6242 (2013.01); G01V 2210/667 (2013.01)

(58) Field of Classification Search
CPC .. G01V 20/00; G01V 1/282; G01V 2210/667; G01V 2210/6242; G01F 17/18
See application file for complete search history.

(56) References Cited

U.S. PATENT DOCUMENTS

| | | | | | |
|---|---|---|---|---|---|
| 4,964,099 | A | * | 10/1990 | Carron | G01V 1/282 |
| | | | | | 367/73 |
| 12,298,457 | B2 | * | 5/2025 | AlKawai | G01V 1/003 |

(Continued)

OTHER PUBLICATIONS

Estimating Subsurface Parameter Fields for Seismic Migration: Velocity Model Building. Jones. Oct. 2015 (Year: 2015).*

*Primary Examiner* — Sujoy K Kundu
(74) *Attorney, Agent, or Firm* — Troutman Pepper Locke LLP

(57) ABSTRACT

Methods of generating a parameter realization, for a subsurface parameter, as a function of depth within a subsurface region are disclosed herein. The methods include dividing a subsurface parameter profile for the subsurface region into a plurality of adjacent stratigraphic units. The methods also include splitting each stratigraphic unit of the plurality of adjacent stratigraphic units into a plurality of stratigraphic unit layers. The methods further include determining a layer parameter value range for each stratigraphic unit layer of the plurality of stratigraphic unit layers and for each stratigraphic unit. The methods also include, within each stratigraphic unit layer, selecting a corresponding layer parameter value from within the layer parameter value range. The methods further include generating the parameter realization by assigning the corresponding layer parameter value to the parameter realization for a corresponding layer depth range of each stratigraphic unit layer.

20 Claims, 4 Drawing Sheets

(56)                    References Cited

U.S. PATENT DOCUMENTS

| | | | |
|---|---|---|---|
| 12,352,913 B2* | 7/2025 | Silveira de Albuquerque Martins | G01V 1/282 |
| 2019/0302295 A1* | 10/2019 | Hoversten | G01V 1/282 |
| 2022/0236439 A1* | 7/2022 | Fawad | G01V 1/50 |
| 2022/0317324 A1* | 10/2022 | Grechishnikova | G01V 1/50 |
| 2023/0349277 A1* | 11/2023 | Li | G06N 3/0455 |

* cited by examiner

100

110
Generate subsurface parameter profile

120
Divide subsurface parameter profile

130
Split each stratigraphic unit

140
Determine layer parameter value range

150
Select corresponding layer parameter value

160
Enforce predetermined layer-to-layer trend

170
Generate parameter realization

180
Utilize parameter realization

190
Repeat

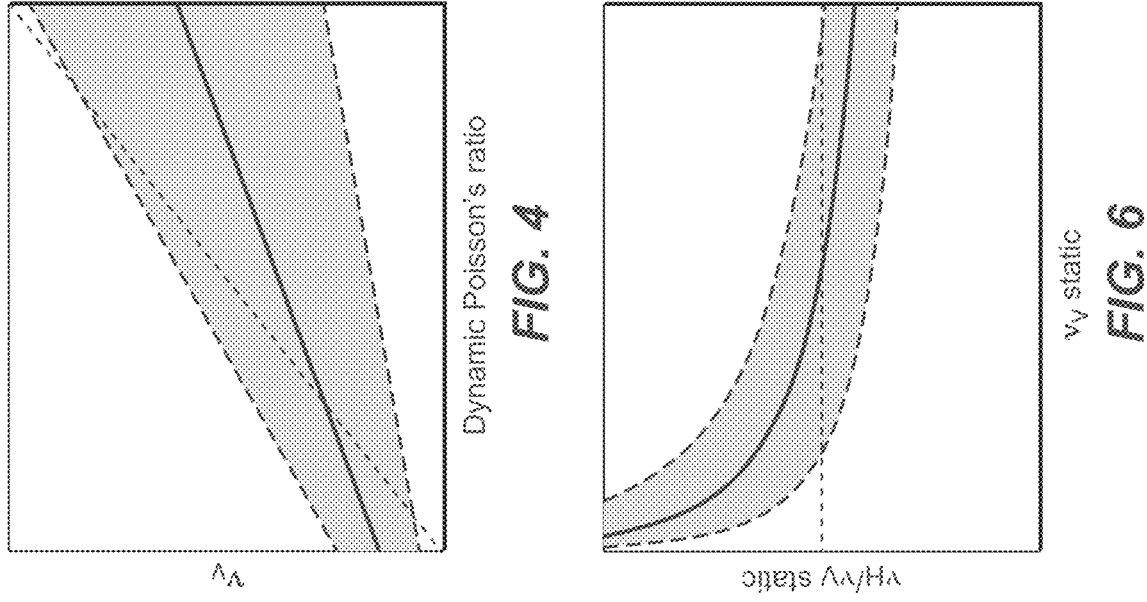
Dynamic Poisson's ratio
*FIG. 4*
$\nu_V$
Dynamic Young's Modulus (Mpsi)
*FIG. 3*
$E_V$ static (Mpsi)
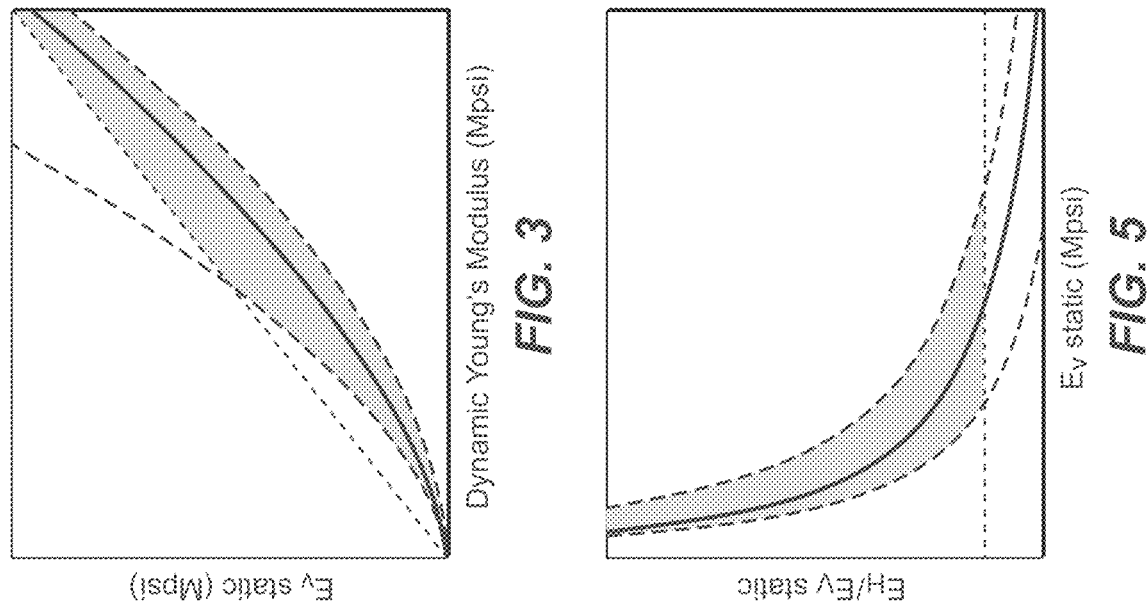
$\nu_V$ static
*FIG. 6*
$\nu H/\nu v$ static
$E_V$ static (Mpsi)
*FIG. 5*
$E_H/E_V$ static

METHODS OF GENERATING A PARAMETER REALIZATION FOR A SUBSURFACE PARAMETER

CROSS-REFERENCE TO RELATED APPLICATION

This application claims priority to and the benefit of U.S. Provisional Application No. 63/476,426, entitled "METHODS OF GENERATING A PARAMETER REALIZATION FOR A SUBSURFACE PARAMETER," having a filing date of Dec. 21, 2022, the disclosure of which is incorporated herein by reference in its entirety.

FIELD OF THE DISCLOSURE

The present disclosure relates generally to methods of generating a parameter realization for a subsurface parameter.

BACKGROUND OF THE DISCLOSURE

Subsurface parameters often are estimated, such as to permit and/or facilitate inclusion of the estimated subsurface parameters within models of a subsurface region. As an example, layer-to-layer horizontal stress within the subsurface region may be estimated and then may be utilized as an input to hydraulic fracturing models. While standard statistical methodologies may be utilized to estimate uncertainty, such as via generation of probability distributions for the subsurface parameter, it may be computationally challenging to apply the estimated uncertainty in a meaningful manner and/or to utilize the estimated uncertainty as an input to certain classes of models. Thus, there exists a need for improved methods of generating a parameter realization for a subsurface parameter.

SUMMARY OF THE DISCLOSURE

Methods of generating a parameter realization, for a subsurface parameter, as a function of depth within a subsurface region are disclosed herein. The methods include dividing a subsurface parameter profile for the subsurface region into a plurality of adjacent stratigraphic units. The subsurface parameter profile includes a probability distribution of the subsurface parameter as a function of depth within the subsurface region, and each stratigraphic unit of the plurality of adjacent stratigraphic units extends within a corresponding stratigraphic depth range within the subsurface region. The methods also include splitting each stratigraphic unit into a plurality of stratigraphic unit layers such that each stratigraphic unit layer of the plurality of stratigraphic unit layers extends within a corresponding layer depth range that is a subset of the corresponding stratigraphic depth range for each stratigraphic unit. The methods further include determining a layer parameter value range that extends between a layer minimum parameter value and a layer maximum parameter value. The layer parameter value range may be determined within each stratigraphic unit layer of the plurality of stratigraphic unit layers for each stratigraphic unit and may be based, at least in part, on the subsurface parameter profile within each stratigraphic unit layer. The methods also include, within each stratigraphic unit layer, selecting a corresponding layer parameter value from within the layer parameter value range. The methods further include generating the parameter realization by assigning the corresponding layer parameter value to the parameter realization for the corresponding layer depth range of each stratigraphic unit layer.

BRIEF DESCRIPTION OF THE DRAWINGS

FIG. 3 is an example illustrating information that may be utilized to estimate a static vertical Young's modulus from dynamic Young's modulus data derived from well logs.

FIG. 4 is an example illustrating information that may be utilized to estimate a static vertical Poisson's ratio from dynamic Poisson's ratio data derived from well logs.

FIG. 5 is an example illustrating information that may be utilized to estimate a ratio of static horizontal-to-vertical Young's modulus from a static vertical Young's modulus.

FIG. 6 is an example illustrating information that may be utilized to estimate a ratio of static horizontal-to-vertical Poisson's ratio from a static vertical Poisson's ratio.

DETAILED DESCRIPTION AND BEST MODE OF THE DISCLOSURE

Figure 1:
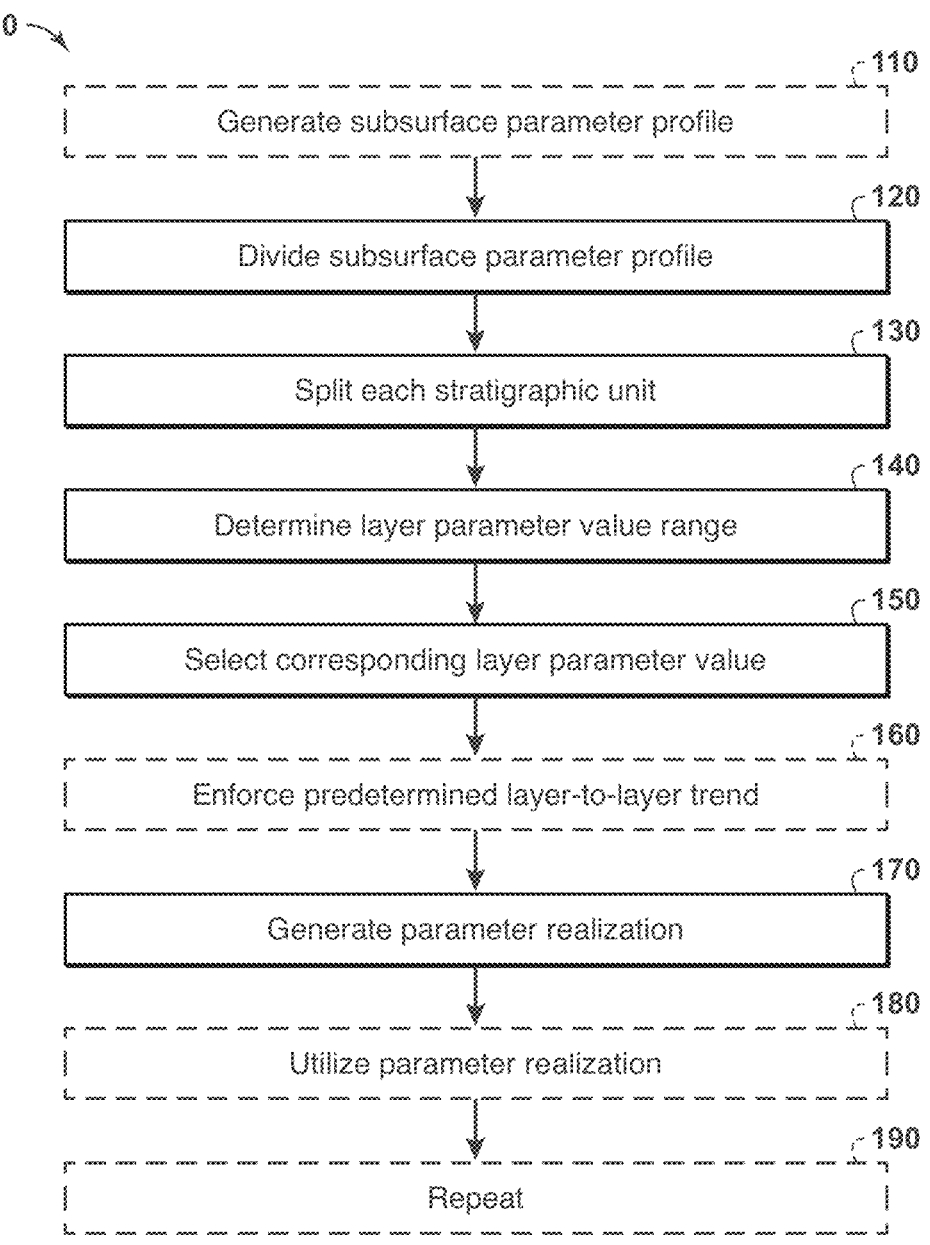
FIG. 1 is a flowchart depicting examples of methods of generating a parameter realization, for a subsurface parameter, as a function of depth within a subsurface region.
Figure 2:
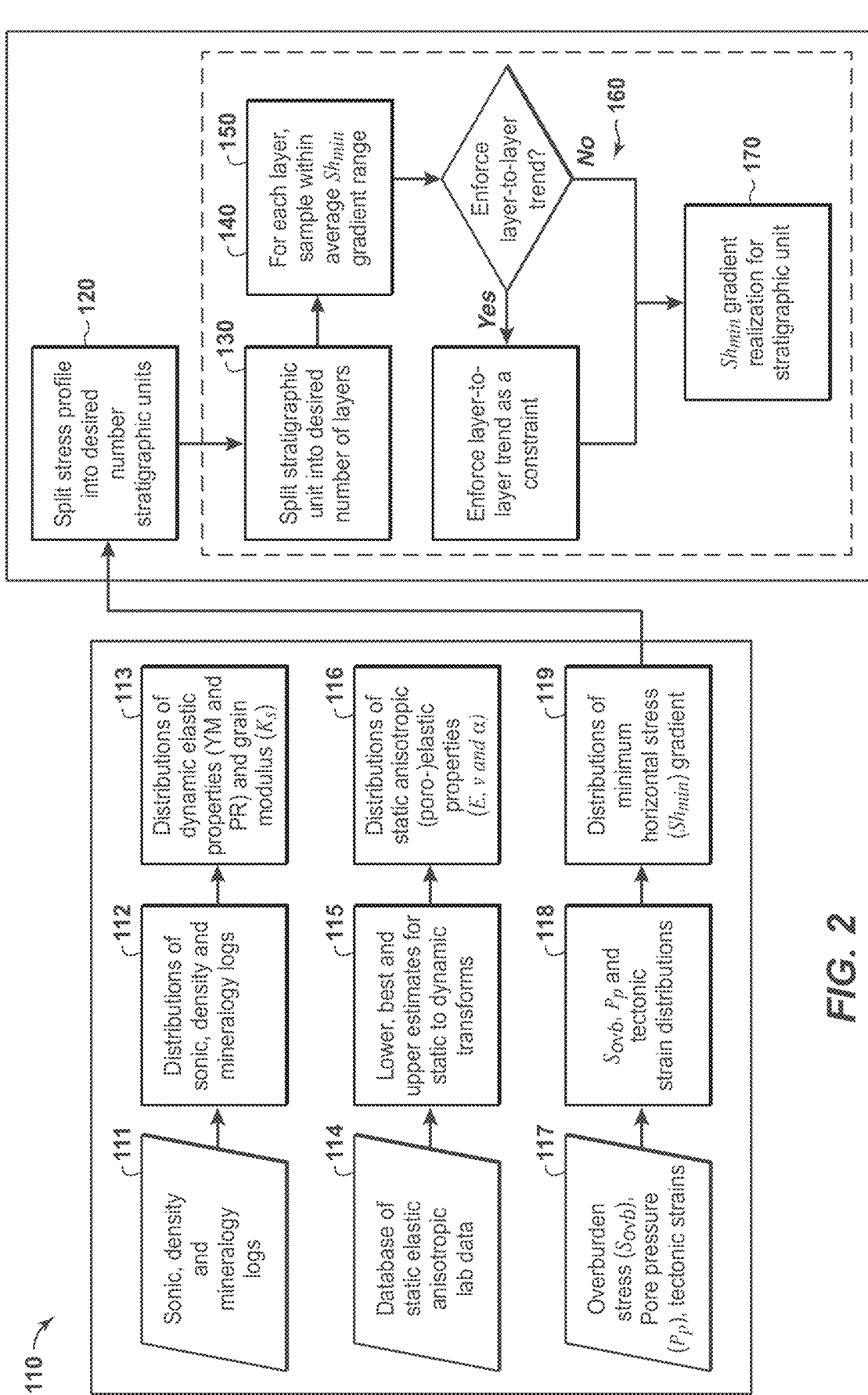
FIG. 2 is another flowchart depicting examples of methods of generating a parameter realization, for a subsurface parameter, as a function of depth within a subsurface region.
Figures 7, 8, 9, 10, 11:
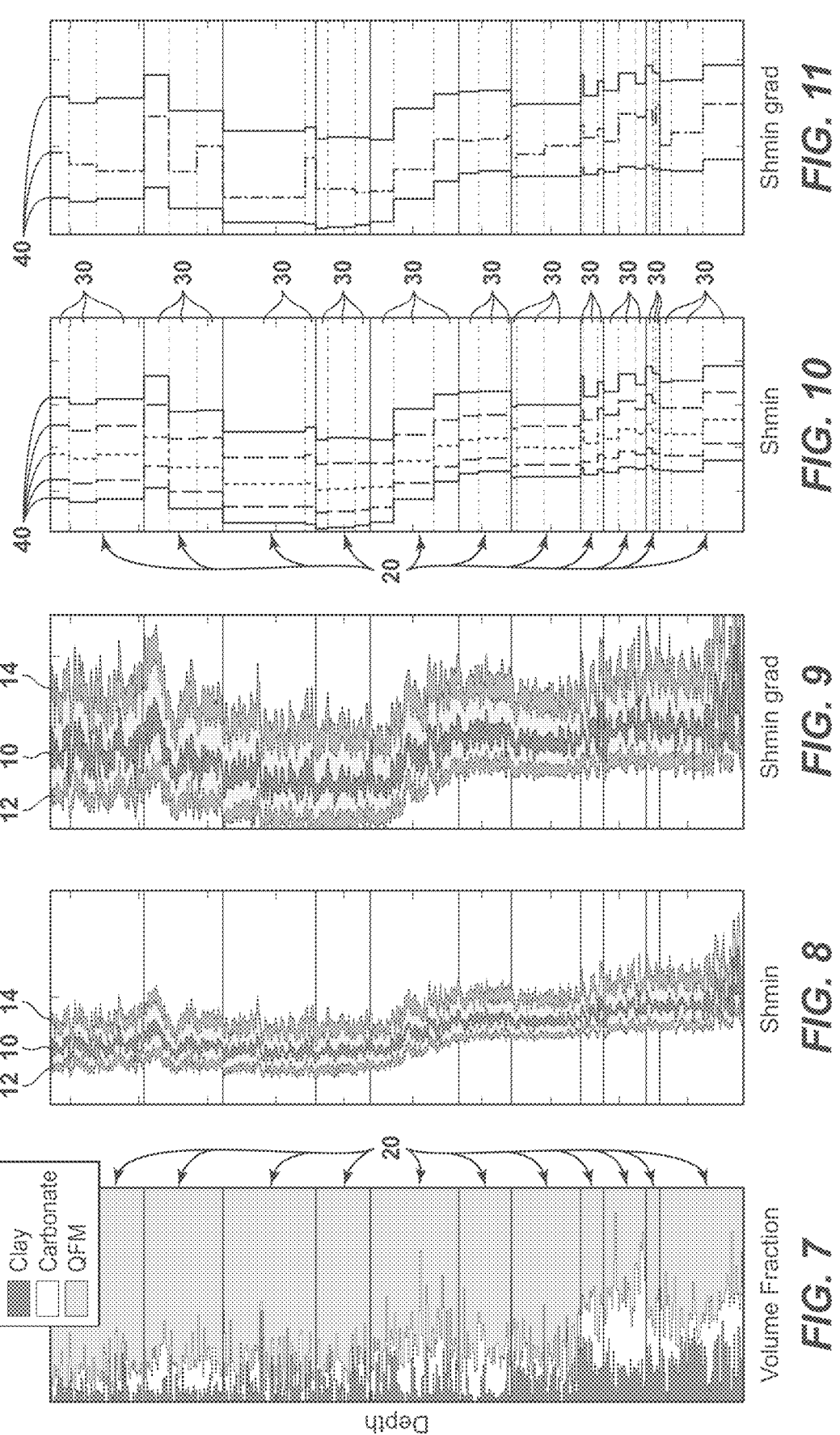
FIG. 7 is a plot illustrating an example of mineral composition as a function of depth within a subsurface region.
FIG. 8 is a plot illustrating an example of a minimum horizontal stress probability distribution as a function of depth within the subsurface region of FIG. 7.
FIG. 9 is a plot illustrating an example of a minimum horizontal stress gradient probability distribution as a function of depth within the subsurface region of FIG. 7.
FIG. 10 is a plot illustrating examples of parameter realizations for minimum horizontal stress that may be generated utilizing methods, according to the present disclosure.
FIG. 11 is a plot illustrating examples of parameter realizations for minimum horizontal stress gradient that may be generated utilizing methods, according to the present disclosure.

FIG. 1 is a flowchart depicting examples of methods 100 of generating a parameter realization, for a subsurface parameter, as a function of depth within a subsurface region; and FIG. 2 is another flowchart depicting examples of methods 100 of generating a parameter realization, for a subsurface parameter, as a function of depth within a subsurface region. The subsurface region may include a plurality of different strata, or layers, of varying compositions, and FIG. 7 is a plot illustrating an example of mineral composition as a function of depth within an example of a subsurface region for which methods 100 may be utilized to generate the parameter realization.

As illustrated in FIGS. 1-2, methods 100 may include generating a subsurface parameter profile at 110, and methods 100 include dividing the subsurface parameter profile at 120. Methods 100 also include splitting each stratigraphic unit at 130, determining a layer parameter value range at 140, and selecting a corresponding layer parameter value at 150. Methods 100 also may include enforcing a predetermined layer-to-layer trend at 160, methods 100 include generating the parameter realization at 170, and methods 100 may include utilizing the parameter realization at 180 and/or repeating at 190.

The subsurface parameter profile includes a probability distribution of the subsurface parameter as a function of depth within the subsurface region. The subsurface parameter profile may include and/or be any suitable data, database, array, table, and/or function that includes, describes, and/or quantifies the probability distribution of the subsurface parameter. As an example, the subsurface parameter profile may include and/or be a measured subsurface parameter profile generated via measurement of the probability distribution of the subsurface parameter as the function of depth. As another example, the subsurface parameter profile may include and/or be an estimated subsurface parameter profile that estimates the probability of various values of the subsurface parameter at various depths within the subsurface region.

It is within the scope of the present disclosure that the subsurface parameter profile may include any suitable probability distribution as the function of depth for a subsurface parameter. As an example, the subsurface parameter profile may include and/or be a subsurface minimum horizontal stress profile that includes a probability distribution of subsurface minimum horizontal stress as the function of depth within the subsurface region. An example of such a minimum horizontal stress probability distribution is illustrated in FIG. 8. As another example, the subsurface parameter profile may include and/or be a subsurface minimum horizontal stress gradient profile that includes a probability distribution of subsurface minimum horizontal stress gradient as a function of depth within the subsurface region. An example of such a minimum horizontal stress gradient probability distribution is illustrated in FIG. 9. In FIGS. 8-9, central bands 10 correspond to best estimate (or P50) values of the given probability distribution as the function of depth, lower bands 12 correspond to minimum values of the given probability distribution as the function of depth, and upper bands 14 correspond to maximum values of the given probability distribution as the function of depth. Generating the subsurface parameter profile at 110, when performed, may include generating the subsurface parameter profile in any suitable manner. As an example, the generating at 110 may include measuring the subsurface parameter profile. As another example, the generating at 110 may include estimating and/or calculating the subsurface parameter profile. As another example, the generating at 110 may include estimating and/or calculating the subsurface parameter profile based, at least in part, on one or more measured values and/or variables, such as may be determined from well logs and/or during drilling of a wellbore within the subsurface region.

In a specific example, the generating at 110 may include determining a governing equation for the subsurface parameter. The governing equation may describe the subsurface parameter as a function of a plurality of input variables. In such an example, the generating at 110 also may include determining value ranges for each input variable of the plurality of input variables at a plurality of depths within the subsurface region. The value ranges may be determined as a function of, or at a plurality of, depths within the subsurface region.

It is within the scope of the present disclosure that at least a subset of the value ranges for at least a subset of the input variables may be directly measured and/or directly determined. Additionally or alternatively, it is also within the scope of the present disclosure that at least a subset of the value ranges for at least a subset of the input variables may be indirectly measured, indirectly determined, and/or calculated. As an example, the determining the value ranges may include transforming at least one known variable value range for at least one known variable, which may differ from the plurality of input variables, to at least one input variable value range for at least one input variable of the plurality of input variables.

The generating at 110 further may include utilizing the value ranges for each input variable, with the governing equation, to produce and/or to generate the probability distribution of the subsurface parameter at each depth of the plurality of depths. This may be accomplished in any suitable manner. As an example, the generating at 110 may include performing a corresponding Monte Carlo simulation, utilizing the governing equation and the value ranges for each input variable, at each depth of the plurality of depths to determine the probability distribution of the subsurface parameter at each depth of the plurality of depths.

In a more specific example, and as discussed, the subsurface parameter may include and/or be the minimum horizontal shear stress within the subsurface region. In such an example, the minimum horizontal shear stress, Shmin, may be estimated according to Equation (1):

$$S_{hmin} = \frac{E_H}{E_V} \frac{v_V}{1 - v_H}(S_{ovb} - \alpha_V P_p) + \alpha_H P_t + \frac{E_H}{1 - v_H^2}\varepsilon_h + \frac{E_H v_H}{1 - v_H^2}\varepsilon_H \quad (1)$$

where $v_V$ is the vertical Poisson's ratio, $v_H$ is the horizontal Poisson's ratio, $E_V$ is the vertical Young's modulus, $E_H$ is the horizontal Young's modulus, $S_{ovb}$ is the overburden stress, $\varepsilon_h$ is the minimum tectonic strain, $\varepsilon_H$ is the maximum tectonic strain, $\alpha_V$ and $\alpha_H$ are Biot's coefficients, and $P_p$ is pore pressure.

With reference to FIG. 2, some of the above variables may be estimated from dynamic measurements, such as may be taken from sonic data and/or from mineralogy logs, as indicated at 111. Distributions of values of related variables as the function of depth within the subsurface region may be taken from such dynamic measurements, as indicated at 112, and subsequently transformed to distributions of dynamic values for these variables, such as for dynamic values of elastic properties such as Young's modulus and Poisson's ratio, as indicated at 113.

In addition, and with continued reference to FIG. 2, databases of static elastic anisotropic laboratory data, as indicated at 114, may be utilized to generate estimates for static-to-dynamic transformations that may be utilized to transform data taken from the dynamic measurements to corresponding static values, as indicated at 115. Examples of such static-to-dynamic transformations are illustrated in FIGS. 3-6. In particular, FIG. 3 is an example illustrating information that may be utilized to estimate a static vertical Young's modulus from dynamic Young's modulus data derived from well logs, FIG. 4 is an example illustrating information that may be utilized to estimate a static vertical Poisson's ratio from dynamic Poisson's ratio data derived from well logs, FIG. 5 is an example illustrating information that may be utilized to estimate a ratio of static horizontal-to-vertical Young's modulus from a static vertical Young's modulus, and FIG. 6 is an example illustrating information that may be utilized to estimate a ratio static horizontal-to-vertical Poisson's ratio from a static vertical Poisson's ratio. Utilizing such static-to-dynamic transformations, distributions of static elastic anisotropic properties, such as Young's modulus, Poisson's ratio, and Biot's coefficients (after estimation of effective mineral bulk modulus), may be estimated from the distributions of dynamic values, as indicated at 116.

Other variables, such as overburden stress, pore pressure, and tectonic strains, may be estimated in other manners, as indicated at 117, to generate distributions for these variables, as indicated at 118. The distributions for all of the relevant variables then may be utilized to generate the probability distribution of the subsurface parameter as the function of depth within the subsurface region utilizing Equation (1), as indicated at 119. This may be accomplished in any suitable manner. As an example, the distributions of all of the relevant variables may be utilized, with Equation (1), in Monte Carlo simulations to generate the probability distribution of the subsurface parameter as the function of depth within the subsurface region.

Dividing the subsurface parameter profile at 120 may include dividing the subsurface parameter profile for the subsurface region into a plurality of adjacent stratigraphic units, with each stratigraphic unit of the plurality of adjacent stratigraphic units extending within a corresponding stratigraphic depth range within the subsurface region. This is illustrated in FIGS. 7-11, with different stratigraphic units being separated by solid horizontal lines.

The dividing at 120 may be performed in any suitable manner and/or based upon any suitable criteria. As an example, the dividing at 120 may include dividing based, at least in part, on naturally occurring stratigraphic boundaries within the subsurface region. As another example, the dividing at 120 may include dividing such that each stratigraphic unit is relatively homogeneous and/or has a relatively homogeneous composition. As another example, the dividing at 120 may include dividing based upon predetermined information and/or knowledge regarding the subsurface region. As another example, the dividing at 120 may include arbitrarily and/or randomly dividing the subsurface parameter profile for the subsurface region into the plurality of adjacent stratigraphic units.

The dividing at 120 may include dividing such that each stratigraphic unit is adjacent at least one other stratigraphic unit of the plurality of adjacent stratigraphic units. Stated differently, the dividing at 120 may include dividing such that each stratigraphic unit defines a boundary with and/or contacts at least one other stratigraphic unit. The dividing at 120 additionally or alternatively may include dividing such that the corresponding stratigraphic depth range of each stratigraphic unit differs from the corresponding stratigraphic depth range of each other stratigraphic unit of the plurality of adjacent stratigraphic units and/or such that the corresponding stratigraphic depth range of each stratigraphic unit is a subset of a profile depth range of the subsurface parameter profile. This is illustrated in FIG. 7, with each stratigraphic unit 20 being adjacent, and distinct from, each other stratigraphic unit 20 such that the plurality of adjacent stratigraphic units continuously extends within the subsurface region.

Splitting each stratigraphic unit at 130 may include splitting each stratigraphic unit into a plurality of stratigraphic unit layers, with each stratigraphic unit layer of the plurality of stratigraphic unit layers extending within a corresponding layer depth range. The corresponding layer depth range may be a subset of the corresponding stratigraphic depth range for each stratigraphic unit. This is illustrated in FIGS. 10-11, with different stratigraphic unit layers separated by dashed horizontal lines within corresponding stratigraphic units, which are separated by solid horizontal lines. For clarity, the stratigraphic unit layers are indicated at 30 in FIG. 10.

The splitting at 130 may include splitting each stratigraphic unit into a corresponding number of stratigraphic unit layers. The corresponding number of stratigraphic unit layers may be the same for all stratigraphic units in the plurality of adjacent stratigraphic units. Alternatively, the corresponding number of stratigraphic unit layers may differ among at least some, and optionally all, of the plurality of adjacent stratigraphic units. The corresponding number of stratigraphic unit layers may include any suitable number of stratigraphic unit layers, examples of which include at least 2, at least 3, at least 4, at least 5, at most 10, at most 8, at most 6, and/or at most 4 stratigraphic unit layers.

Each stratigraphic unit layer may define a corresponding layer depth, such as may be measured as the distance between corresponding horizontal lines in FIGS. 10-11. It is within the scope of the present disclosure that the corresponding layer depth may have any suitable magnitude. As an example, a depth ratio of the corresponding layer depth of each stratigraphic unit layer to the corresponding layer depth range of a corresponding stratigraphic unit within which each stratigraphic unit layer extends may be at least 0.05, at least 0.10, at least 0.2, at least 0.3, at least 0.4, at least 0.5, at most 0.95, at most 0.9, at most 0.8, at most 0.7, at most 0.6, at most 0.5, at most 0.4, and/or at most 0.3.

Within a given stratigraphic unit, the corresponding layer depth may be constant. Stated differently, and within each stratigraphic unit, the corresponding layer depth of each stratigraphic unit layer may be equal to the corresponding layer depth of each other stratigraphic unit layer. Alternatively, the corresponding layer depth may vary, either within a given stratigraphic layer or among the plurality of adjacent stratigraphic units. Stated differently, and within a given stratigraphic unit of the plurality of adjacent stratigraphic units, the corresponding layer depth of at least one stratigraphic unit layer may differ from the corresponding layer depth of at least one other stratigraphic unit layer.

Determining the layer parameter value range at 140 may include determining the layer parameter value range within each stratigraphic unit layer of each stratigraphic unit. Stated differently, and with reference to FIG. 10, the determining at 140 may include determining the layer parameter value range for each stratigraphic unit layer 30. The layer parameter value range for each stratigraphic unit layer may be determined based, at least in part, on the subsurface parameter profile within each stratigraphic unit layer and may extend between a layer minimum parameter value and a layer maximum parameter value. The layer parameter value range may extend between, and include, the layer minimum parameter value and the layer maximum parameter value.

The determining at 140 may include determining the layer parameter value range within each stratigraphic unit layer in any suitable manner. As an example, the determining at 140 may include determining, establishing, estimating, and/or calculating the layer minimum parameter value and the layer maximum parameter value. In a more particular example, the probability distribution of the subsurface parameter as the function of depth within the subsurface region may include a plurality of individual probability distributions of the subsurface parameter, with each individual probability distribution of the plurality of individual probability distributions being defined at a corresponding depth within the subsurface region.

In such an example, the determining the layer minimum parameter value may include determining the layer minimum parameter value based, at least in part, on each individual probability distribution. As an example, the determining the layer minimum parameter value may include determining an average of a minimum value of each individual probability distribution of the plurality of individual probability distributions of the subsurface parameter that are defined at a corresponding depth that is within each layer. As another example, the determining the layer minimum parameter value may include determining and/or averaging an $M^{th}$ percentile of the minimum value of each individual probability distribution defined at the corresponding depth that is within the layer. Examples of the $M^{th}$ percentile include the $1^{st}$ percentile, the $5^{th}$ percentile, and the $25^{th}$ percentile.

Additionally, or alternatively, and in such an example, the determining the layer maximum parameter value may include determining the layer maximum parameter value based, at least in part, on each individual probability distribution. As an example, the determining the layer maximum parameter value may include determining an average of a maximum value of each individual probability distribution of the plurality of individual probability distributions defined at the corresponding depth that is within each layer. As another example, the determining the layer maximum parameter value may include determining and/or averaging an $N^{th}$ percentile of the maximum value of each individual probability distribution defined at the corresponding depth that is within the layer. Examples of the $N^{th}$ percentile include the $99^{th}$ percentile, the $95^{th}$ percentile, and the $75^{th}$ percentile.

Selecting the corresponding layer parameter value at 150 may include selecting, within each stratigraphic unit layer, a corresponding layer parameter value from within the layer parameter value range. Stated differently, the selecting at 150 may include selecting, for each stratigraphic unit layer, a corresponding layer parameter value that is between the layer minimum parameter value and the layer maximum parameter value for the given stratigraphic unit layer. The selecting at 150 may be accomplished in any suitable manner. As examples, the selecting at 150 may include randomly selecting the corresponding layer parameter value from within the layer parameter value range, selecting the corresponding layer parameter value from an evenly weighted distribution of parameter values within the layer parameter value range, and/or selecting the corresponding layer parameter value from an unevenly weighted distribution of parameter values within the layer parameter value range. It is within the scope of the present disclosure that the selecting at 150 may include selecting a single corresponding layer parameter value for each stratigraphic unit layer.

Enforcing the predetermined layer-to-layer trend at 160 may include enforcing and/or requiring the, or a specific, predetermined layer-to-layer trend, within the parameter realization generated during the generating at 170, between adjacent stratigraphic units and/or between adjacent stratigraphic unit layers within a given stratigraphic unit of the plurality of adjacent stratigraphic units. The enforcing at 160 may be performed in any suitable manner. As an example, the enforcing at 160 may include ensuring that the parameter realization follows the predetermined layer-to-layer trend. As another example, the enforcing at 160 may include excluding, from the parameter realization, corresponding layer parameter values that are outside the predetermined layer-to-layer trend. As yet another example, and prior to the selecting at 150, the enforcing at 160 may include modifying the layer parameter value range of at least one stratigraphic unit layer such that each layer parameter value within the layer parameter value range is consistent with, or falls within, the predetermined layer-to-layer trend.

In a specific example, methods 100 may include sequentially performing the selecting at 150 to select the corresponding layer parameter value for a given stratigraphic unit layer, and methods 100 further may include subsequently performing the selecting at 150 to select the corresponding layer parameter value for an adjacent stratigraphic unit layer. In such an example, the enforcing at 160 may include ensuring that the corresponding layer parameter value for the given stratigraphic unit layer and the corresponding layer parameter value for the adjacent stratigraphic unit layer follow the predetermined layer-to-layer trend. In some examples, and as perhaps best illustrated in FIG. 2, the ensuring that the parameter realization follows the predetermined layer-to-layer trend may include repeating the selecting at 150 for the adjacent stratigraphic unit layer until the corresponding layer parameter value for the given stratigraphic unit layer and the corresponding layer parameter value for the adjacent stratigraphic unit layer follow the predetermined layer-to-layer trend.

The predetermined layer-to-layer trend may include and/or be any suitable predetermined layer-to-layer trend and/or may be based upon any suitable criteria. As an example, the predetermined layer-to-layer trend may require less than a threshold difference in the subsurface parameter, or in a magnitude of the subsurface parameter, between the given stratigraphic unit layer and the adjacent stratigraphic unit layer. As another example, the predetermined layer-to-layer trend may require a specific and/or a predetermined overall change in the subsurface parameter as a function of depth within the subsurface region.

Generating the parameter realization at 170 may include generating the parameter realization by assigning the corresponding layer parameter value to the parameter realization for the corresponding layer depth range of each stratigraphic unit layer. This is illustrated in FIGS. 10-11, with FIG. 10 illustrating examples of parameter realizations for minimum horizontal shear stress that may be generated utilizing methods 100, and with FIG. 11 illustrating examples of parameter realizations for minimum horizontal shear stress gradient that may be generated utilizing methods 100. In FIGS. 10-11, individual parameter realizations are indicated at 40; and, as discussed, each individual parameter realization has a constant value (i.e., the corresponding layer parameter value) within each individual stratigraphic unit layer 30. It is within the scope of the present disclosure that the generating at 170 may include producing and/or generating any suitable parameter realization. As an example, and as illustrated by FIGS. 10-11, the generating at 170 may include plotting each corresponding layer parameter value for each corresponding layer depth range. As additional examples, the generating at 170 may include generating a database that assigns each corresponding layer parameter value to each corresponding layer depth range and/or generating a function that assigns each corresponding layer parameter value to each corresponding layer depth range.

As used herein, the phrase "parameter realization" refers to a collection of possible and/or potential representations, magnitudes, and/or values for the subsurface parameter as a function of depth within the subsurface region. Each parameter realization is only a single representation of the possible values for the subsurface parameter, and it is within the scope of the present disclosure that a plurality of parameter realizations may be produced and/or generated, utilizing methods 100, such as to permit and/or facilitate improved understanding of variability in the subsurface parameter within the subsurface region and/or to permit and/or facilitate inclusion of this variability in subsequent calculations, such as is discussed in more detail herein with reference to the utilizing at 180.

Utilizing the parameter realization at 180 may include utilizing the parameter realization in any suitable manner and/or for any suitable purpose. As an example, the utilizing at 180 may include utilizing the parameter realization as an input to a model of the subsurface region. An example of the model of the subsurface region includes a hydraulic fracturing model of the subsurface region.

Repeating at 190 may include repeating any suitable step and/or steps of methods 100 in any suitable order and/or for any suitable purpose. As an example, the repeating at 190 may include repeating the selecting at 150, optionally repeating the enforcing at 160 (if performed), and repeating the generating at 170 to generate a plurality of distinct parameter realizations. Examples of the plurality of distinct parameter realizations are illustrated in FIGS. 10-11 and indicated at 40.

As another example, the repeating at 190 may include repeating the utilizing at 180 for each parameter realization of the plurality of distinct parameter realizations. This may, for example, permit and/or facilitate estimation and/or understanding of impacts of variability in the subsurface parameter, via the plurality of distinct parameter realizations, on results of and/or outputs from, the model of the subsurface region. Stated differently, repeating the utilizing at 180 may provide a computationally efficient mechanism via which variability in the subsurface parameter may be incorporated within, accounted for, and/or understood in the context of the model of the subsurface region.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the well drilling, hydrocarbon exploration, geothermal, hydrocarbon production, and carbon capture, utilization, and storage industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of generating a parameter realization, for a subsurface parameter, as a function of depth within a subsurface region, the method comprising:

measuring, during drilling of a wellbore within the subsurface region, one or more values associated with the subsurface region to obtain one or more measured values;

determining, based on the one or more measured values, a subsurface parameter profile for the subsurface region;

dividing the subsurface parameter profile for the subsurface region into a plurality of adjacent stratigraphic units, wherein the subsurface parameter profile includes a probability distribution of the subsurface parameter as a function of depth within the subsurface region, and further wherein each stratigraphic unit of the plurality of adjacent stratigraphic units extends within a corresponding stratigraphic depth range within the subsurface region;

splitting each stratigraphic unit into a plurality of stratigraphic unit layers, wherein each stratigraphic unit layer of the plurality of stratigraphic unit layers extends within a corresponding layer depth range that is a subset of the corresponding stratigraphic depth range for each stratigraphic unit;

within each stratigraphic unit layer of the plurality of stratigraphic unit layers of each stratigraphic unit and based, at least in part, on the subsurface parameter profile within each stratigraphic unit layer, determining a layer parameter value range that extends between a layer minimum parameter value and a layer maximum parameter value;

within each stratigraphic unit layer, selecting a corresponding layer parameter value from within the layer parameter value range;

generating the parameter realization by assigning the corresponding layer parameter value to the parameter realization for the corresponding layer depth range of each stratigraphic unit layer; and utilizing the parameter realization as an input to a model of the subsurface region.

2. The method of claim 1, wherein the dividing the subsurface parameter profile includes dividing such that each stratigraphic unit is adjacent at least one other stratigraphic unit of the plurality of adjacent stratigraphic units.

3. The method of claim 1, wherein the dividing the subsurface parameter profile includes dividing such that the corresponding stratigraphic depth range of each stratigraphic unit at least one of:

(i) differs from the corresponding stratigraphic depth range of each other stratigraphic unit of the plurality of adjacent stratigraphic units; and (ii) is a subset of a profile depth range of the subsurface parameter profile.

4. The method of claim 1, wherein the dividing the subsurface parameter profile includes dividing based, at least in part, on naturally occurring stratigraphic boundaries within the subsurface region.

5. The method of claim 1, wherein the splitting each stratigraphic unit includes splitting into a corresponding number of stratigraphic unit layers.

6. The method of claim 5, wherein the corresponding number of stratigraphic unit layers for each stratigraphic unit is equal to the corresponding number of stratigraphic unit layers for each other stratigraphic unit of the plurality of adjacent stratigraphic units.

7. The method of claim 5, wherein the corresponding number of stratigraphic unit layers for at least one stratigraphic unit of the plurality of adjacent stratigraphic units differs from the corresponding number of stratigraphic unit layers for at least one other stratigraphic unit of the plurality of adjacent stratigraphic units.

8. The method of claim 5, wherein the corresponding number of stratigraphic unit layers includes at least one of:

(i) at least 2, at least 3, at least 4, or at least 5 stratigraphic unit layers; and (ii) at most 10, at most 8, at most 6, or at most 4 stratigraphic unit layers.

9. The method of claim 1, wherein each stratigraphic unit layer defines a corresponding layer depth.

10. The method of claim 9, wherein a depth ratio of the corresponding layer depth of each stratigraphic unit layer to the corresponding layer depth range of a corresponding stratigraphic unit is at least one of:

(i) at least 0.05, at least 0.10, at least 0.2, at least 0.3, at least 0.4, or at least 0.5; and (ii) at most 0.95, at most 0.9, at most 0.8, at most 0.7, at most 0.6, at most 0.5, at most 0.4, or at most 0.3.

11. The method of claim 9, wherein, within a given stratigraphic unit of the plurality of adjacent stratigraphic units, the corresponding layer depth of each stratigraphic unit layer is equal to the corresponding layer depth of each other stratigraphic unit layer of the plurality of stratigraphic unit layers.

12. The method of claim 9, wherein, within a given stratigraphic unit of the plurality of adjacent stratigraphic units, the corresponding layer depth of at least one stratigraphic unit layer of the plurality of stratigraphic unit layers differs from the corresponding layer depth of at least one other stratigraphic unit layer of the plurality of stratigraphic unit layers.

13. The method of claim 1, wherein, within each layer, determining the layer parameter value range includes determining the layer minimum parameter value and determining the layer maximum parameter value.

14. The method of claim 13, wherein the probability distribution of the subsurface parameter as the function of depth within the subsurface region includes a plurality of individual probability distributions of the subsurface parameter, each defined at a corresponding depth within the subsurface region.

15. The method of claim 14, wherein the determining the layer minimum parameter value includes at least one of:

(i) determining an average of a minimum value of each individual probability distribution of the plurality of individual probability distributions of the subsurface parameter defined at a corresponding depth that is within each layer;

(ii) determining a $5^{th}$ percentile of the minimum value of each individual probability distribution;

(iii) determining a $25^{th}$ percentile of the minimum value of each individual probability distribution; and (iv) determining a minimum $M^{th}$ percentile of the minimum value of each individual probability distribution.

16. The method of claim 14, wherein the determining the layer maximum parameter value includes at least one of:

(i) determining an average of a maximum value of each individual probability distribution of the plurality of individual probability distributions of the subsurface parameter defined at a corresponding depth that is within the layer;

(ii) determining a $95^{th}$ percentile of the maximum value of each individual probability distribution;

(iii) determining a $75^{th}$ percentile of the maximum value of each individual probability distribution; and (iv) determining a maximum $N^{th}$ percentile of the maximum value of each individual probability distribution.

17. The method of claim 1, wherein the selecting the corresponding layer parameter value includes at least one of:

(i) randomly selecting the corresponding layer parameter value from within the layer parameter value range;

(ii) selecting the corresponding layer parameter value from an evenly weighted distribution of parameter values within the layer parameter value range; and (iii) selecting the corresponding layer parameter value from an unevenly weighted distribution of parameter values within the layer parameter value range.

18. The method of claim 1, wherein the generating the parameter realization includes at least one of:

(i) plotting each corresponding layer parameter value for each corresponding layer depth range;

(ii) generating a database that assigns each corresponding layer parameter value to each corresponding layer depth range; and (iii) generating a function that assigns each corresponding layer parameter value to each corresponding layer depth range.

19. The method of claim 1, further comprising:
utilizing the model for hydrocarbon production.

20. The method of claim 1, wherein the model comprises a hydraulic fracturing model of the subsurface region.

* * * * *